Figure 1:
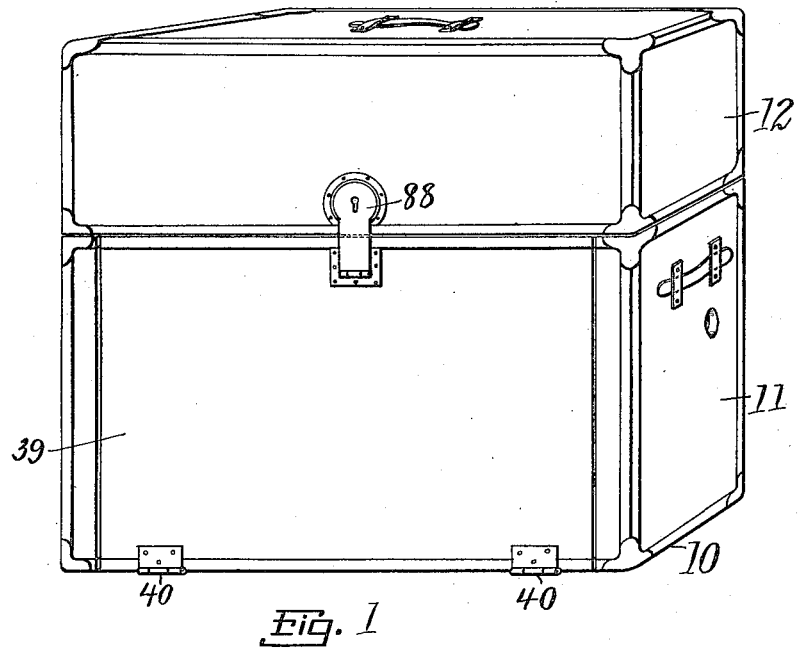

June 19, 1923.

E. A. WIDMANN ET AL 1,459,426

COMBINED PHONOGRAPH AND SOUND CHARACTER EXHIBITING DEVICE

Filed June 20, 1918   3 Sheets-Sheet 1

INVENTORS
Eugene A. Widmann and
Frank D. Lewis
BY
H. H. Dyke
ATTORNEY

June 19, 1923.
E. A. WIDMANN ET AL
1,459,426
COMBINED PHONOGRAPH AND SOUND CHARACTER EXHIBITING DEVICE
Filed June 20, 1918
3 Sheets-Sheet 2
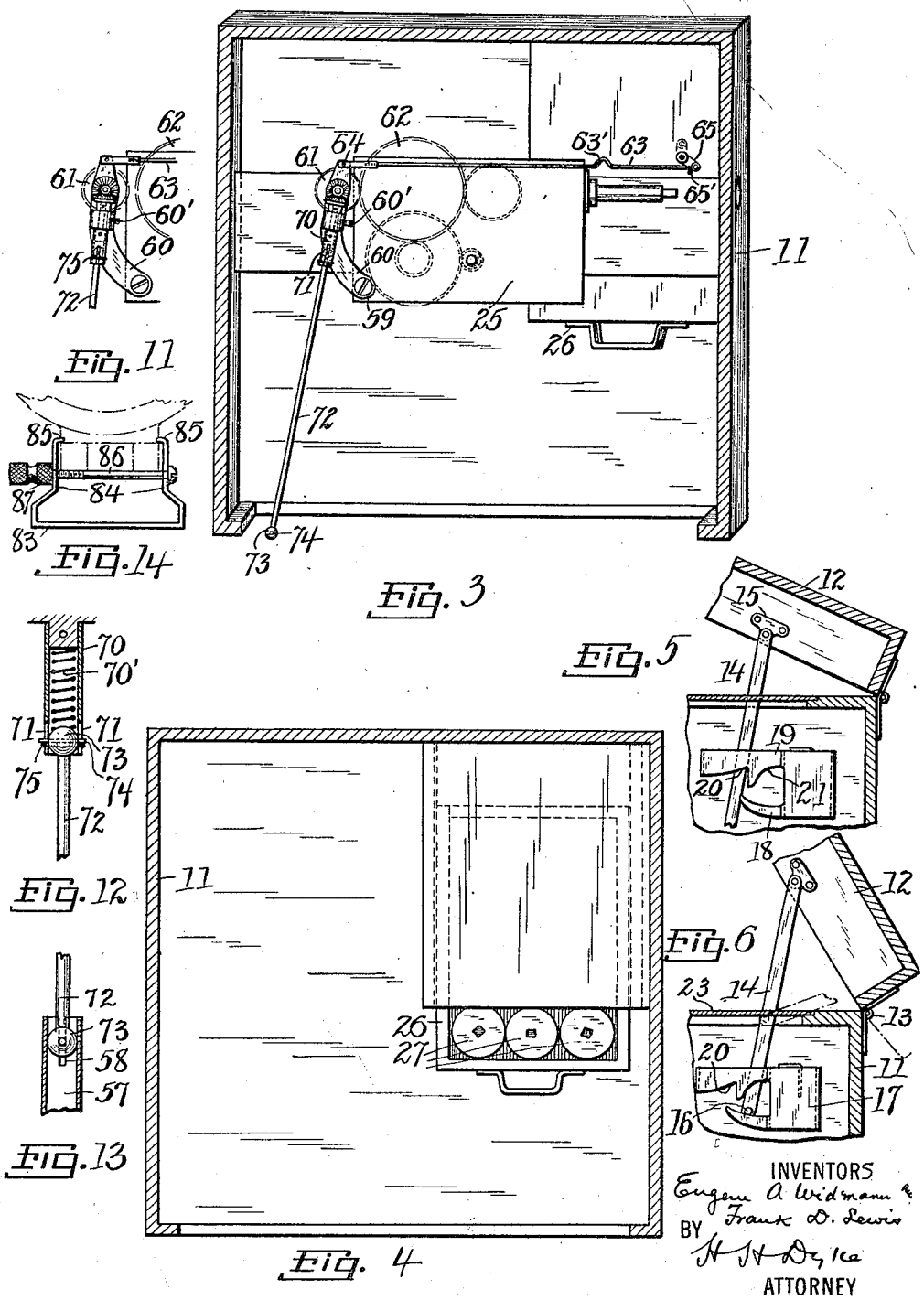
INVENTORS
Eugene A. Widmann &
Frank D. Lewis
BY
ATTORNEY

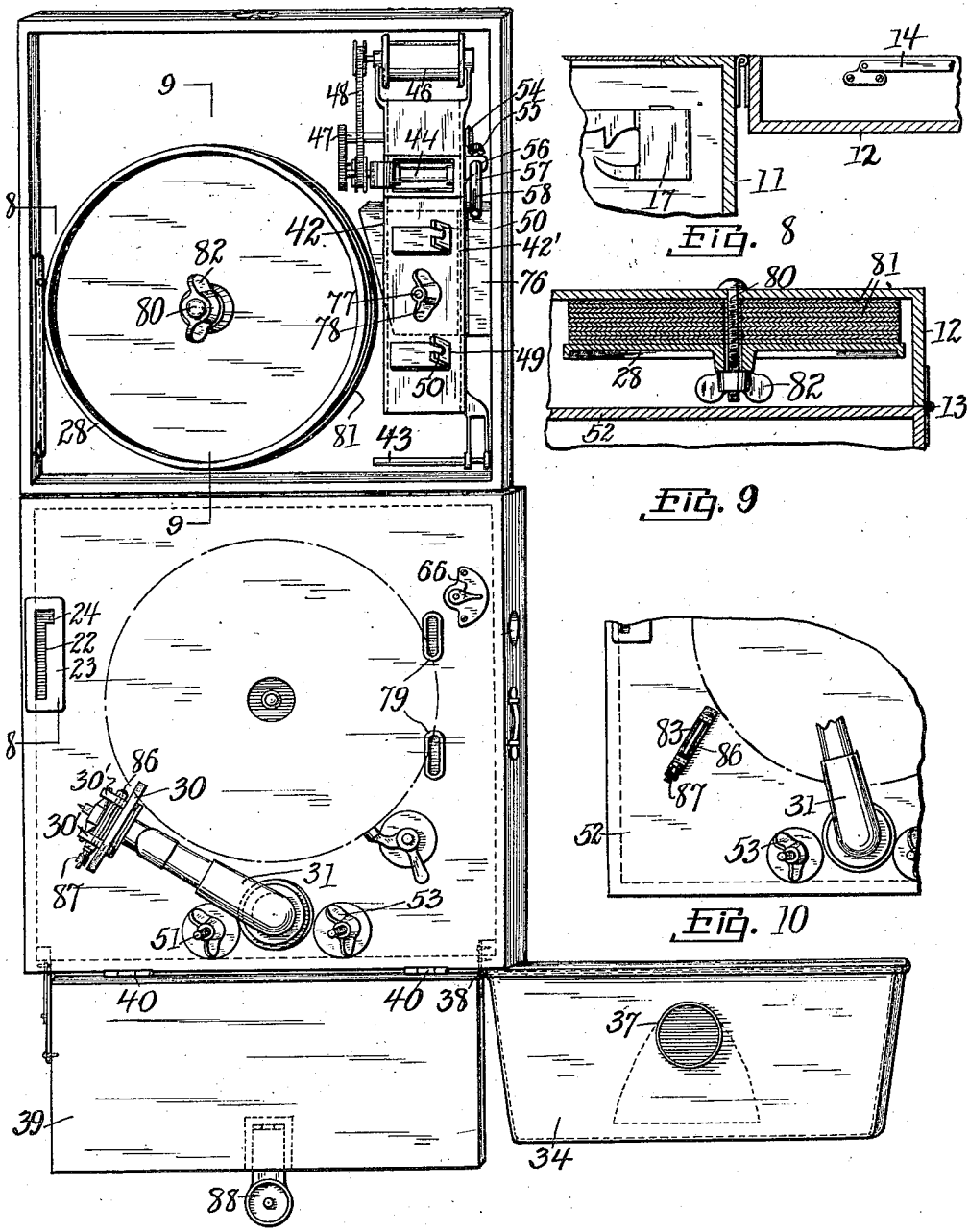

Patented June 19, 1923.

1,459,426

UNITED STATES PATENT OFFICE.

EUGENE A. WIDMANN, OF BROOKLYN, NEW YORK, AND FRANK D. LEWIS, OF WEST ORANGE, NEW JERSEY, ASSIGNORS TO PATHE FRERES PHONOGRAPH COMPANY, OF NEW YORK, N. Y., A CORPORATION OF DELAWARE.

COMBINED PHONOGRAPH AND SOUND-CHARACTER-EXHIBITING DEVICE.

Application filed June 20, 1918. Serial No. 241,027.

*To all whom it may concern:*

Be it known that we, EUGENE A. WIDMANN and FRANK D. LEWIS, citizens of the United States, and residents of Brooklyn, county of Kings, and State of New York, and West Orange, county of Essex, and State of New Jersey, respectively, have invented certain new and useful Improvements in Combined Phonograph and Sound-Character-Exhibiting Devices, of which the following is a specification.

Our invention relates to apparatus for synchronously reproducing sounds and exhibiting visible characters, such as printed words, music or the like, corresponding to the sounds. Apparatus of this character, comprising a phonograph of the Pathe type and means for unrolling and exposing to view a printed tape or ribbon carrying words or other characters corresponding to the sounds reproduced by the phonograph, is designated by the term "Pathegraph."

Among the objects of the present invention is the provision of such apparatus in compact form and enclosed in a suitable case or cabinet, wherein all the parts may be packed, and adapted for safe transportation and to stand rough handling. Apparatus of this type may be utilized to advantage, for example, for instructing soldiers in foregin languages, and an apparatus constructed in accordance with the present invention is well adapted to withstand rough treatment to which it may be subjected at soldiers' camps.

Another object of the invention is the provision of means for exhibiting the tape, ribbon or the like bearing the visible symbols as a removable attachment which can be readily connected for use and readily disconnected and packed away in the carrying case or cabinet.

Another object of the invention consists in the construction of the carrying case in such a manner as that the various parts and supplies may be packed away in the case and secured in spaces provided for that purpose in such a manner as to avoid rattling or coming loose, which might result in injury of the apparatus when set up for use.

Our invention is further directed to the improvement of apparatus of this character in a number of important respects, and with the foregoing and related objects in view, our invention consists in the parts, improvements, combinations and features of construction herein set forth and claimed.

Figure 2:
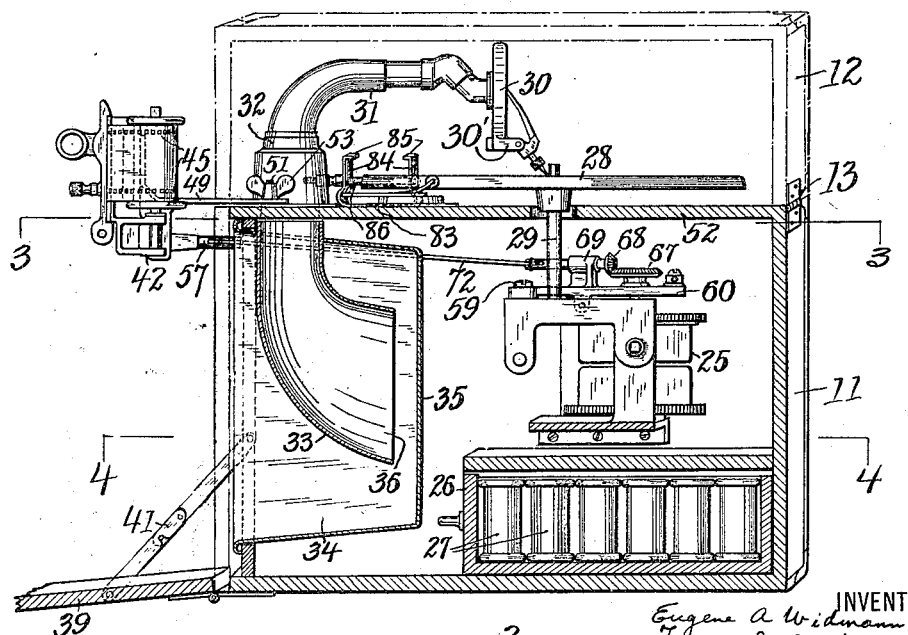

In the accompanying drawings Figure 1 is a perspective view of the Pathegraph case closed and ready for transportation. Figure 2 is a view, partly in perspective and partly in vertical, central cross-section, of the Pathegraph with the parts arranged for use. Figure 3 is a view partly in perspective and partly in horizontal cross-section, the cross-sectional parts being taken substantially on the line 3, 3, Figure 2. Figure 4 is a horizontal sectional view on line 4, 4, Figure 2. Figures 5 and 6 are detail sectional views showing the lid in two different positions. Figure 7 is a part plan and part perspective view of the Pathegraph with the lid turned back and the tape operating mechanism secured in place therein, and also showing the horn swung out to provide access to the interior of the cabinet. Figure 8 is a view similar to Figures 5 and 6 and showing the lid turned all the way back, the sectional part of this figure being taken on line 8, 8, Figure 7. Figure 9 is a fragmentary cross-sectional view taken substantially on the line 9, 9, Figure 7. Figure 10 is a fragmentary plan view showing the means for holding the reproducer and tone arm securely in place when the machine is arranged for transportation. Figure 11 is a detail plan view of a clutching and declutching apparatus. Figures 12 and 13 are detail sectional views of shaft end mountings, and Figure 14 is a side view of the means for holding the reproducer in place which is shown in plan view in Figure 10.

The cabinet or case may be of any form, but with an apparatus designed for safe transportation and to withstand rough handling it may have the form substantially of a trunk 10 comprising a body portion 11 and a lid 12, the lid 12 being preferably hinged to the body portion 11 as at 13. A stay arm is preferably provided adapted to support the lid 12 in position when raised and released, to permit it to be swung entirely back or to be closed, and in the form shown such stay arm 14 is pivoted to the lid at 15 and has a pin 16 at its lower end adapted to engage a guiding and supporting member 17 attached to the body 11. The member 17 has a lower projecting horn or the like 18 and an upper projecting member 19 provided with a notch 20. Upon the lid being raised, the pin 16 engages the notch 20, which serves to limit, for the time being, the upward movement of the lid, and upon dropping it back somewhat, the pin 16 engages the horn 18, whereby the lid is supported. Upon being again raised, the pin 16 encounters the curved guiding surface 21, whereby the arm is forced backward somewhat, and upon the lid being lowered permits the lid to be closed, the pin 16 passing back of the horn 18, which extends laterally from the member 17 to make such movement possible. The stay arm 14 passes through a slot 22 in a guide piece 23, and the slot 22 is provided with a lateral extension 24 through which the arm 14, with the pin 16, may be withdrawn to permit the lid 12 being fully opened, as shown in Figure 8.

The stay arm and its cooperating member 17 is the sole invention of the applicant Frank D. Lewis and is not claimed in the present case, and other forms of stay arms or the like may be utilized.

The lid 12 is preferably of fairly considerable height to provide for the storage therein of parts of the apparatus, as will hereinafter be referred to more in detail.

The body 11 of the cabinet contains the phonograph motor 25, which is preferably secured in place therein at some little distance above the bottom of the cabinet so as to provide room therebeneath for storage purposes. In the form shown a drawer 26 for containing spools 27 of ribbon or tape carrying visible symbols, as printed words or the like. is provided, but this storage space may be otherwise utilized, as will be understood.

The phonograph is preferably of the disk type, and when of such type may comprise a turntable 28 driven from a motor shaft 29.

The reproducer 30 may be mounted on a tone arm 31 having a universal bearing at 32. Horns of various types may be utilized, but we preferably make use of a horn of the reflex type comprising a downwardly and rearwardly extending portion 33, which, when in operative position, communicates with the tone arm 31, and a megaphone portion 34 comprising a sound board 35 toward which the mouth 36 of the horn portion 33 is directed. The portions 33 and 34 of the horn are preferably secured together as by passing the portion 33 through an opening 37 in the portion 34 and securing it in place about said opening. The horn so constituted is preferably mounted so as to be movable into and out of place in the cabinet, as, for example, it may be hinged thereto at one edge, as shown at 38, Figure 7, in which view the horn is shown swung outwardly, giving access to the interior of the cabinet, as, for example, for insertion or removal of the drawer 26, and the cabinet is preferably made open on the forward side to permit the horn being swung in and out, and the cabinet is preferably provided on that side with a closure, as indicated at 39, Figure 1, which may be hinged to the bottom of the cabinet as at 40, 40, and may be provided with a stay arm, as shown at 41, Figure 2. Such closure 39 serves to complete the cabinet when closed, and is left open, as shown in Figure 2, when the horn is to be swung in or out or when the apparatus is used for sound reproduction.

The tape or ribbon feeding mechanism is designated generally by the reference numeral 42. The construction of the ribbon feeding mechanism per se does not constitute a part of the present invention, the present invention being directed, so far as this part of the apparatus is concerned, to the driving connection thereof to the phonograph motor and the detachable mounting thereof upon the apparatus. It may comprise a post 43 upon which the spools 27 are placed and a toothed sprocket 44 adapted for unwinding the ribbons by contact of the sprocket teeth with the perforations 45 provided in the ribbon for that purpose, the ribbon being rewound after exposure upon a rewinding spool 46. The shaft of the sprocket 44 is driven from a counter-shaft 47, and the rewinding spool 46 is driven from the shaft 44, as by means of a pulley 48. The whole ribbon feeding apparatus, designated by the reference numeral 42, is detachably mounted upon the cabinet so that it may be readily secured in place and readily removed, and in the form shown it is provided with laterally extending arms 49 having preferably open ended slots 50, 50 therein which are adapted to receive bolts 51, 51 provided on the instrument board 52 of the cabinet body 11 and provided with wing nuts 53 which may be readily turned to clamp the apparatus 42 in place upon the cabinet.

Provision is made for readily connecting and disconnecting the drive for the apparatus 42 to the phonograph motor. Also provision is preferably made for clutching and declutching such drive to the phonograph motor, as it may be desirable at times to clutch and declutch the ribbon feeding apparatus 42 and the phonograph motor without removing the apparatus 42 from its place. In the form shown the shaft 47 has a bevel gear 54 thereon which meshes with a bevel gear 55 journalled in an extension 56 of the frame or casting 42' and having secured thereto, to rotate therewith, a hollow sleeve 57 which is provided with longitudinally extending, open ended slots 58 on each side.

Mounted on the motor frame for pivotal movement as by means of a screw 59, is an arm 60, which carries a pinion 61 adapted to engage with a gear wheel 62 of the motor. The arm 60 and pinion 61 may be moved to and away from the gear wheel 62 as by means of a rod 63 pivotally connected to the arm 60 at 64, and pivotally connected at its opposite end to a crank 65 which is operated by a lever 66 on top of the instrument board 52, as shown clearly in Figure 7, so that by rotating the lever 66 the pinion 61 may be brought into and out of engagement with the gear wheel 62. The rod 63 is preferably fairly long and thin and may be provided with a kinked or offset portion between its ends, as indication at 63'. When the gears 61 and 62 are disengaged, as in Figure 11, the crank 65 has preferably substantially the position shown in dotted lines in Figure 3, the full lines showing the crank arm 65 in engaged position of the gears. It will be seen that in moving from disengaging to engaging position, the arm 65 carries the rod 63 beyond dead centre, which is permitted by the offset or kinked portion 63' of the rod 63, and a locking engagement is secured, further movement of the arm 65 being prevented by means such as a stop pin 65". Means may be provided for limiting the movement of the arm 60 to prevent binding between the pinion 61 and gear 62, as, for example, a set-screw 60' may be provided for this purpose and may be adapted to act as a stop as by contact with the motor frame, and proper engaging relation of the gears may be obtained by adjustment of the limit screw 60'. The bevel gear 67 turns with the pinion 61 and operates the bevel gear 68 which is arranged in an upward extension 69 of the arm 60 and has secured to turn therewith a hollow tubular member 70 provided with a pair of open ended slots 71, 71. The drive shaft 72 is adapted to engage the hollow tubular members 57 and 70 and is provided with preferably spherical heads 73 having opposite pins 74 adapted to be received in the slots 58 and 71. The projecting spherical head 73 may readily be removed from or inserted in the tubular member 57 with the pins 74 received in the slots 58, but the opposite head 73 is preferably prevented from leaving the tubular member 70 by the provision of suitable means, such as a clamping ring 75 adapted to engage a groove provided for that purpose in the tubular member 70, but such clamping ring may be sprung off and the drive shaft 72 disconnected from the tubular member 70 if desired. A spring 70' in the tubular member 70 tends to force the ball 73 and pins 74 therein against the clamping collar 75, but the shaft 72 may be pushed inwardly against said spring, thereby facilitating entry of the opposite end of the shaft 72 into the tubular member 57. It will be seen that the drive shaft 72 has substantially a universal joint connection at each end, and that the location of the ribbon feeding device with respect to the motor 25 may vary to a considerable extent without interfering with the securing of efficient driving action. Also the arm 60 is adapted to be moved to engage or disengage the pinion 61 and gear 62 by reason of the universal mounting of the drive shaft 72.

The device 42 projects forwardly from the apparatus when in use, and this is the most desirable location for this part of the apparatus as the words or other indicia thereon are most effectively displayed to the observer when so located. As already stated, such device may be removed by loosening the wing nuts 53, and provision is preferably made for its storage within the trunk or cabinet. In the form illustrated, the apparatus 42 is stored within the lid 12, a block 76 being provided therein with a bolt 77 and wing nut 78 by which the ribbon displaying apparatus 42 may be clamped in a suitable position within the lid 12, the bolt 77 passing through an opening provided therein for that purpose. The arms 49 are of fairly considerable length, and openings 79, 79 are provided in the instrument board 52 so that the lid may be closed without interference therewith by the ends of the arms 49, 49 which enter the holes 79, 79.

Provision is also preferably made for storing disk records within the lid 12, and to this end a bolt 80 may be passed therethrough, upon which the disk records 81, 81 may be strung by the holes in their centers and may be clamped into place by a wing nut 82, the turntable 28 being preferably removed and used as a bottom clamping device for the records 81, 81, as clearly shown in Figure 9.

Means are also provided for clamping the tone arm and reproducer in place on the instrument board, and the same may comprise a yoke-shaped member 83 secured to the instrument board 52, the upwardly projecting arms 84, 84 thereof being provided with inward extensions 85, 85 and a screw 86 being passed through the arms 84 and preferably provided with a knurled nut 87. These flanged arms 84 are adapted to engage the sound box 30, taking over the lugs 30', 30' in which the reproducer arm shown is pivoted, and when so engaged may be clamped by screwing up on the nut 87 so that the reproducer and tone arm will be firmly and securely held in place.

The operation and use of the device will be apparent from the foregoing description. When it is to be put away or moved from one place to another, the records and ribbon display apparatus 42 are preferably secured in the lid, as shown in Figures 7 and 9, the reproducer and tone arm clamped in place, as shown in Figure 7, and the ribbon spools 27 located in their drawer 26 within the cabinet body. The closure 39 is brought into the closed position indicated in Figure 1 and the cover locked thereto by means of a lock 88 so that the cabinet is entirely closed and appears as shown in Figure 1. To make use of the apparatus the lock 88 is opened and the closure 39 swung downward to the position of Figure 2, the lid opened all the way back, as in Figure 8, and the attachment 42, the records and turntable removed from the cover and the attachment 42 and turntable 28 placed in their proper positions on the machine, as shown in Figure 2, and the reproducer freed by unscrewing the nut 87, the shaft 72 having been caused to enter the tubular sleeve 57 at the time of locating the attachment 42 in its correct place. To remove the ribbon spools 27 the horn is swung outwardly and the drawer 26 containing the spools removed, after which the horn 34 may be swung back into the position shown in Figure 2. Upon now placing the proper record upon the turntable and the corresponding spool in place upon the display apparatus 42, sounds may be reproduced and simultaneously therewith a visible record of corresponding sounds, such as printed words or the like, displayed. If at any time the desired synchronism should not be obtained or is interfered with, the lever 66 may be operated to declutch the display apparatus from the phonographic apparatus, whereupon the phonograph may continue to operate while the display tape or ribbon remains stationary. When so declutched the phonograph may be used as an ordinary phonograph, if desired.

It will be seen that by our invention there is provided a simple, compact and complete Pathegraph apparatus in which provision is made for the storage of the apparatus parts and other devices and supplies required for use therewith, that the same can be readily and quickly set up for use, and all the parts, devices and supplies may be stored and firmly secured in place within the container and are adapted to be transported and subjected to rough handling without injury.

We claim:

1. In combination a phonograph, a shaft universally connected thereto and rotated therefrom, said shaft projecting beyond the phonograph cabinet, a ribbon feeding device detachably carried by the phonograph cabinet and adapted for exhibiting to view visible symbols corresponding with sounds reproduced by the phonograph, and a universal driving connection for said ribbon feeding device adapted to be detachably connected with said projecting shaft.

2. The combination of a phonograph, a ribbon feeding device for exhibiting visible symbols arranged as an attachment to the phonograph and adapted to be connected thereto or detached therefrom, and rotary means for driving said ribbon feeding device from the phonograph and comprising a universal joint connection, the parts whereof are adapted to be separated when the ribbon feeding device is detached and to be connected when the latter is attached in operative position.

3. In combination, a phonograph, a ribbon feeding device for exhibiting visible symbols adapted to be attached thereto and comprising a slotted hollow sleeve adapted upon rotation to drive said ribbon feeding device, a shaft adapted to be rotated by the phonograph and having a substantially spherical head, and pins projecting therefrom, said head being adapted to be received within the hollow sleeve, and said pins being adapted to enter said slots therein.

4. The combination of a phonograph comprising a motor, a device for exhibiting visible symbols arranged as an attachment for said phonograph and adapted to be connected thereto or disconnected therefrom, a pivoted arm on the phonograph motor, means for turning said arm on its pivot, a pinion on said arm adapted to be engaged or disengaged from a gear of the motor by movement of said arm, and means including a shaft having universal bearings at its end for imparting movement from said pinion to said ribbon feeding device, said shaft being adapted to be swung with said arm.

5. A phonograph, a ribbon feeding device detachably connected thereto, a rotary drive shaft extending from the motor of the phonograph to the ribbon feeding device for driving the same and having a detachable universal joint connection therewith, and a universal joint connection at the opposite end of said shaft for connecting same to the phonograph motor.

6. A phonograph motor comprising a spur gear, an arm pivotally mounted adjacent thereto, a spur gear carried by the arm and movable therewith into and out of engagement with the motor gear, a ribbon feeding device, and means for imparting feeding movement thereto from the gear on the arm, said means being readily detachable from the ribbon feeding device to facilitate removal and attachment of the latter to a phonograph.

7. A phonograph comprising a motor having a spur gear, an arm pivotally mounted adjacent thereto, manually operable means for moving said arm, a spur gear on the arm movable with the arm into and out of engagement with the motor gear, a pair of bevel gears on the arm driven from the spur gear, a shaft universally connected to and driven from one of the spur gears, said shaft projecting out beyond the phonograph casing, a ribbon feeding device detachably connected to the phonograph, and universal and detachable joint connections from said shaft to said ribbon feeding mechanism.

8. The combination of a phonograph comprising a cabinet having a lid, a ribbon feeding device for exhibiting visible symbols, slotted arms on said device, means for detachably securing said ribbon feeding device to said phonograph by engagement with said slotted arms, means for securing said ribbon feeding device within the cover when out of use, and holes being provided within the phonograph cabinet for the reception of said arms when the lid is closed.

In testimony that we claim the foregoing, we have hereto set our hands, this 17th day of June, 1918.

EUGENE A. WIDMANN.
FRANK D. LEWIS.